(12) United States Patent
Fry (10) Patent No.: US 7,254,556 B2
(45) Date of Patent: Aug. 7, 2007

(54) SYSTEM AND METHOD FOR PAYING DOWN DEBT USING AN EQUITY LOAN REVOLVING LINE OF CREDIT

(76) Inventor: John D. Fry, 1119 Via Vera Cruz, Santa Marcos, CA (US) 92078

( * ) Notice: Subject to any disclaimer, the term of this patent is extended or adjusted under 35 U.S.C. 154(b) by 0 days.

(21) Appl. No.: 10/891,962

(22) Filed: Jul. 15, 2004

(65) Prior Publication Data

US 2005/0060257 A1   Mar. 17, 2005

Related U.S. Application Data

(60) Provisional application No. 60/491,423, filed on Jul. 30, 2003, provisional application No. 60/581,115, filed on Jun. 17, 2004.

(51) Int. Cl.
*G06Q 40/00* (2006.01)
(52) U.S. Cl. .......................................... 705/39; 705/35
(58) Field of Classification Search ................. 705/39, 705/35
See application file for complete search history.

(56) References Cited

U.S. PATENT DOCUMENTS 5,649,117 A   7/1997 Landry

| | | | |
|---|---|---|---|
| 5,878,405 A * | 3/1999 | Grant et al. .................. 705/39 |
| 2003/0149656 A1* | 8/2003 | Magruder et al. ............ 705/38 |
| 2003/0154161 A1* | 8/2003 | Stahl et al. ................... 705/38 |

OTHER PUBLICATIONS

Jepsen, Cara; "Funds go to work for you in a central asset account" Crain's Chicago Business, ☐☐May 11, 1998.*

* cited by examiner

*Primary Examiner*—Jagdish N Patel
(74) *Attorney, Agent, or Firm*—Workman-Nydegger (57) ABSTRACT

A loan system program comprises a loan account having a loan principal on a purchased item, and a secondary account used to pay the amortized interest on the loan principal. A user deposits, such as through automatic deposit, user payments directly into the loan account, thus paying down the loan principal. The user then uses the secondary account for personal expenses that would otherwise be met by the deposited user payments. At the end of the month or grace period, the user pays off the monthly interest on the loan account with the secondary account. The lender than raises the loan balance of the loan account to cover the secondary account balance. At least a portion of the next user deposit to the loan account covers the raise loan balance, and another portion is used to pay down the loan principal.

16 Claims, 4 Drawing Sheets

SYSTEM AND METHOD FOR PAYING DOWN DEBT USING AN EQUITY LOAN REVOLVING LINE OF CREDIT

CROSS-REFERENCE TO RELATED APPLICATIONS

The present invention claims the benefit of priority to U.S. Provisional Patent Application No. 60/491,423, filed on Jul. 30, 2003, entitled "SYSTEM AND METHOD FOR INCREASED EQUITY THROUGH CREDIT CARD REVOLVING LINE OF CREDIT"; and to U.S. Provisional Patent Application No. 60/581,115, filed on Jun. 17, 2004, entitled "SYSTEM AND METHOD FOR INCREASED EQUITY THROUGH CREDIT CARD REVOLVING LINE OF CREDIT" The entire contents of each of the foregoing patent applications are incorporated by reference.

BACKGROUND OF THE INVENTION

1. The Field of the Invention

This invention relates to systems, methods, and computer program products for debt reduction.

2. Background and Relevant Art

Monetary debt, which and entails paying for an item at a later date, is a growing problem for many people. For example, a consumer can now finance any number of secured debts, such as homes, cars, property, expensive goods, as well as unsecured debts, such as items purchased through a credit card or line of credit, education loans, etc. In each case, paying for the item at a later date can add to the expense of the item, and therefore create an unanticipated financial burden on the user.

Figure 1:
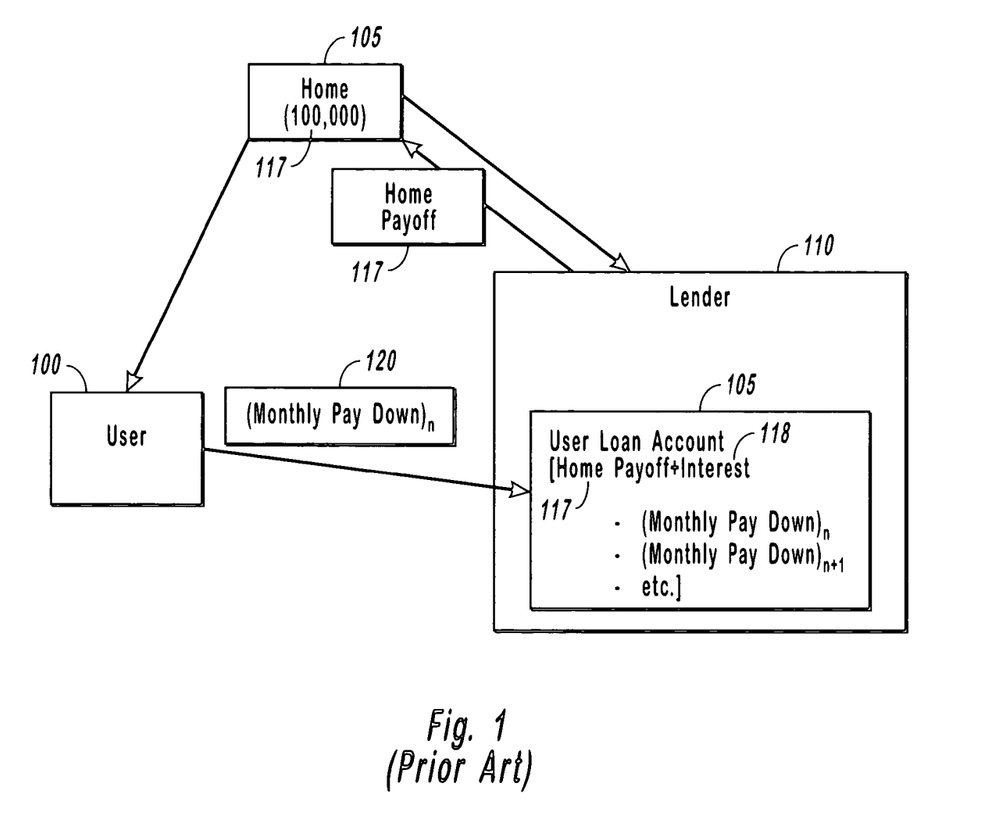
FIG. 1 illustrates a prior art schematic diagram in which a user obtains financing to purchase a property.

In particular, most debts require that the consumer pay back the debt with a certain amount of interest that is amortized over time, making the items far more expensive in the long-run than when purchased initially. As shown in FIG. 1, for example, a user (100) may purchase an item (e.g., a home 105) for a principal amount of $100,000 (117) by asking a lender (110) to finance the item (105) at a certain interest rate (118), such as an interest rate of 5%, amortized over 30 years. Using a simple interest calculation, the monthly payment (120) of principal (117) and interest (118) on such a purchase would be approximately $540, with the total amount paid on the loan being approximately $194,000. After making the final payment in the 30 year period, the user will have paid almost double ($194,000) the amount of the initial purchase ($100,000).

In some cases, the financed items will appreciate in value over time, such that the value of the item is still greater than the total amount paid in the end. This, however, is not the case for many other depreciating items, such as debts to purchase cars, clothing, food, etc., which lose value with use over time In particular, depreciating items are typically not worth the amount paid for them with interest, especially at the time the consumer makes the last payment on the debt. For example, a payment of $100 in clothing (e.g., one or two pairs of pants) could accrue approximately $20 in interest assuming conventional interest rates, and assuming conventional minimum monthly payments. Thus, the used clothing is usually worth far less than paid initially by the time the final payment has been made (roughly a year in this example). This problem becomes far worse when the consumer fails to make timely payments, and hence incurs additional fees and interest rate increases.

Accordingly, it is ideal in many cases to purchase an item up front, rather than paying at a later date (i.e., financing the item). While this sort of monetary discipline can be exercised for many types of wanted items, there are some necessary items that cannot ordinarily be purchased by most consumers without incurring at least some debt. For example, most people do not make enough money, or have enough cash on hand, to purchase a home with without incurring at least some debt.

Furthermore, many people cannot afford even to purchase a home with financing that allows the home to be paid off within a relatively short time to minimize their interest payments, such as a time period of 10–15 years. In particular, short term loans, such as 10–15 year home loans, typically require a high monthly payment. This can be particularly difficult for a user since mortgage payments are usually required in a single monthly payment, such that the user cannot spread the total monthly payment in two partial payments, consistent with the user's bi-weekly paychecks.

Thus, it is fairly common for users to purchase a home with financing that allows the home to be paid off within approximately 30 years. While this provides the benefit of a relatively low monthly payment, the total interest paid on the home is extremely high, often twice the value of the home. Furthermore, this means the user is likely to hold a significant amount of debt on a home up until (or just after) the user is ready to retire, depending on when the user purchased the home.

Accordingly, some programs have been developed to help ease the debt burdens some users may face with large loans. In particular, some programs, such as bi-weekly payment programs, offer a person to pay down a debt, such as a home debt, more quickly than possible under a 30-year loan, without significantly burdening the user's monthly budget.

For example, assuming a monthly mortgage costs $1,000 for a user. A bi-weekly program might allow the user to pay $542 every two weeks, such that the user has overpaid by $84 each month. The program administrator saves the extra $84 until $1000 has been saved up, and then makes an extra payment into the loan at the end of the year. Making an extra payment such as this has been shown to reduce the total term of the loan from approximately 30 years to approximately 22 or 23 years, representing a significant interest savings for the user.

Unfortunately, payoff periods of 20 or more years can still represent a significant burden to many users in terms of time and cost, particularly those users who delay purchasing a home until they are somewhat advanced in age. For example, users who purchase homes while in their forties will still be paying down the debt as they approach retirement. Furthermore bi-weekly programs are not typically cost-free. With reference to the prior example, the program administrator might require the user to pay $684 per check (rather than $584) to operate the program, such that the user pays an additional approximately $200 a month ($100 extra every two weeks) in service fees.

As such, in some cases, a user may believe that the benefits of reducing the term of the debt from 30 years to 20 years is difficult to justify compared to the burden of paying extra service fees with the reapportioned loan amounts each month. For example, biweekly programs, with their service fees, may be too expensive for some users who struggle to pay even the standard monthly debt payment. Still further, bi-weekly programs generally require a person to make additional efforts with their loans, after having spent considerable effort negotiating, procuring, and signing the original home loan.

Accordingly, an advantage in the art can be realized with systems, methods, and computer program products that help a user pay off large debts in a relatively short period of time, such as paying off a home debt in less than 10 years, without substantially burdening the user's monthly budget for other expenses.

BRIEF SUMMARY OF THE INVENTION

The present invention solves one or more of the foregoing problems in the prior art with systems, methods, and computer program products for helping a user pay off a large debt, such as a home debt, in less than 10–15 years, where the debt would otherwise be due in 20–30 years. In particular, implementations of the present invention allow a user to pay off a large home debt—either from the purchase of a home or from a refinance of an existing loan, including consumer debt—much quicker than otherwise possible, while allowing a user to maintain current monthly expenses.

For example, in one implementation, a user obtains a large loan from a lender, using a revolving loan account. The lender (or third party provider) further provides the user with a credit card having a credit limit and a grace period, where the credit limit is sufficient to cover the user's monthly personal expenses, as well as cover the monthly interest on the revolving loan. The user then deposits each user payment, such as a user paycheck, or such amount as the borrower sees fit, into the revolving loan account, such that the principal on the loan is paid down with the frequency and amount that the user is paid (e.g., bi-weekly or more).

The credit account is used to pay off the daily interest that is owed monthly on the revolving loan. Also at the end of the credit account billing period, and further at the end of the credit card grace period, the lender pays off the credit card balance using the revolving loan account, such that the lender momentarily raises the revolving loan account balance, albeit slightly. When the lender receives the next user paycheck, the lender applies the user's payments, such as the user's paycheck, against the increased loan principal.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems that help a user pay off a large debt, such as a home debt, in less than 10–15 years, where the debt would otherwise be due in 20–30 years. In particular, implementations of the present invention allow a user to pay off a large home debt—either from the purchase of a home or from a refinance of an existing loan, including consumer debt—much quicker than otherwise possible, while allowing a user to maintain current monthly expenses.

Figure 2A:
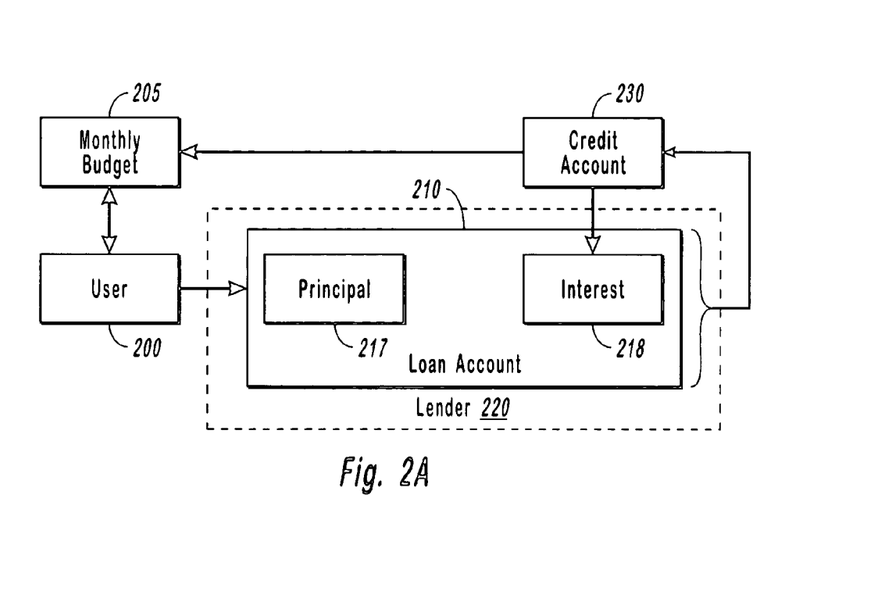
FIG. 2A illustrates a schematic diagram in which a user pays off a loan principal and loan interest using two or more accounts in accordance with an implementation of the present invention.

For example, FIG. 2A illustrates an overview of a loan system in which a lender 220 provides a user 200 with one or more accounts, such as a loan account 210 and a credit account 230, which are used respectively to pay for a given item, and to help pay back the loan account 210. As used herein, a "user" will be understood as any entity, such as an individual, a couple, a small group of individuals, one or more agents, and one or more companies that obtains a loan account 210 from a lender. A "lender" will be understood as a person or entity, such as an agent, or automated software instructions, at the lending institution, that provides the loan account 210, and/or manages the two or more accounts.

A "loan account" will be understood as any type of credit provided by a lender to a user, such as a fixed or variable rate credit that is compounded at any given schedule. Furthermore, the loan account 210 will be understood as any type of credit that can be used to purchase any type of item, such as a home, or any other real property that a given lending institution might ordinarily finance. In particular, frequent reference is made herein to home loan accounts, since such loan accounts are relatively expensive, and since loans such as those can take up to 20–30 years to repay. Nevertheless, one will appreciate that the principles described herein can be applied broadly to a wide variety of items (and corresponding loans). For example, the principles described herein apply to such loans as conventional variable or fixed-interest rate loans, fixed-year (e.g., 1, 2, 3, 4, or 5-year) arms, fixed-year (e.g., 5-year) balloons, and so forth.

Generally speaking, a loan account 210 described herein will also be understood primarily as an account having a measure of credit limit flexibility, such as a revolving loan, a home equity line of credit, or similar such account. In particular, a flexible credit limit type of loan account 210 provides a lender 220 with the ability to increase or decrease the amount of credit available in the loan account, as appropriate. For example, a home equity line of credit has a principal balance that can decrease with payment, or can increase with one or more user purchases (e.g., checks written on the line of credit account) that extend the current principal balance within a predetermined limit. The flexibility afforded by these types of accounts can also provide the user with a number of payment options, as understood from the following description.

Continuing, FIG. 2A illustrates that a loan account 210 can also be described in terms of "principal" 217 and "interest" 218. Generally, "principal" 217 refers to the initial amount of the loan account 210 balance, while "interest" 218 refers generally to the monthly interest on the loan account 210 balance. In a simple example, a revolving loan account to pay for $100,000 of a home will carry a principal balance of $100,000. The amortized monthly "interest" (e.g., from daily amortization or some other period of amortization), however, is a percentage value of the principal loan balance measured over some period of time, such as a number of months or days in a 30-year period (i.e., 360 months, or roughly 131,500 days).

For example, a lender 220 can provide a user with a $100,000 conventional loan, using a conventional 5% interest rate, amortized monthly over 30 years. Using a simple interest calculator, this would result in a monthly payment of $540, which includes some combination of principal 217 and interest 218. The lender 220 can calculate the interest any number of ways, such as by figuring a monthly portion of the annual interest owed (e.g., 5% divided by 12 months) on the loan account 210 balance at the end of a given month. Alternatively, the lender 220 can perform a similar interest calculation on an average daily loan account 210 balance at the end of the given month. With either calculation, the user 200 pays less interest 218 over time as the user pays down the loan principal 217.

The lender 220 can also provide the loan by amortizing the interest 218 daily. In one implementation, for example, a lender 220 can take the conventional interest rate of 5%, and divide it by 360 days (commonly used) or 365 days to get 0.014%. The lender 220 can then compound the interest for each day into the loan account 210 balance, such that the lender 220 raises the loan account 210 balance from $100,000 to $100,014. The next day, the lender 220 factors the interest on the new balance ($100,014), such that overall loan account 210 balance is raised to $100,028, and so on.

In another implementation, the lender 220 can simply add the interest for each daily balance into a separate interest account without compounding each day's interest with the principal. With reference to the foregoing examples and numbers, if the loan account 210 balance remains at $100,000 for the month, the lender 220 may simply add approximately $14 each day into a separate interest account. In this case, the loan account 210 balance would remain at $100,000, while the interest increases from $14 one day, to approximately $28 the next day, and so on. As with monthly amortization, the user 200 pays less interest 218 over time as the user pays down the loan principal 217.

One will appreciate, therefore, that the methods for amortizing interest on a given loan can have a significant impact on the loan account 210 balance. In particular, accounts that are amortized monthly will not accrue interest as quickly as those that are amortized daily. On the other hand, daily amortization usually means that the lender 220 can receive more paid interest, and hence that the loan will cost more to the user 200. As such, monthly amortization is generally more favorable to the user 200, while daily amortization is generally more favorable to the lender 220.

Even still, the user maintains some advantages with daily amortization. In particular, the user can usually make payments on the loan account 210 more than once a month, in contrast to most monthly-amortized loan accounts. This can enable the user to make significant adjustments to the loan account balance, upon which the lender 220 calculates the daily interest.

Accordingly, FIG. 2A illustrates an implementation of the present invention in which the lender 220 takes advantage of these concepts by providing the user 200 with a revolving loan account 210. The loan can be for any fixed or variable term length, and for any value on the property, including up to 100% of the property value (or more, if appropriate). Furthermore, the lender 220 sets up the loan account 210 such that it is amortized daily. In particular, the lender 220 calculates the daily-amortized interest 218 separately, without compounding the interest 218 with the principal 217.

The user 200 then pays the monthly interest 218, as well as all (or a predefined amount) of the user's personal expenses with a credit account 230 that has a certain credit limit (or access limit), and a grace period. As such, the credit limit is at least sufficient to cover the monthly loan interest 218, and to cover the user 200's monthly budget 205.

Using a credit account 230 in this manner can provide the lender 220 and user 200 with a number of advantages. For example, and as will be understood in the following description, the lender 220 can set a certain credit limit that ensures that the user 200 applies a consistent, maximum amount of user payments to the loan account 210 principal 217. In addition, since many credit accounts provide users with rewards, the user can redeem rewards from the credit account 230 for free airplane tickets, free hotel stays, and so forth. That is, the more the user pays with the credit account 230, the more the user is likely to benefit.

The lender 220 can also take advantage of these concepts by requiring the user 200 to deposit all (or some predetermined portion) of the user's payments into the loan account 210, each time the user is paid. This can be done through manual or automatic electronic deposit, although electronic deposit may be more efficient in some situations. For the purposes of this specification and claims, "payments", or "pay" refers to any type of money or compensation that can be received by the user and/or applied to the loan account 210 for any reason. This can include receiving regular or irregular schedules of employment compensation, retirement account payments, social security payments, insurance account withdrawals, monetary transfers from a secondary account (e.g., from a user's savings account to the loan account), and so forth.

Figure 2B:
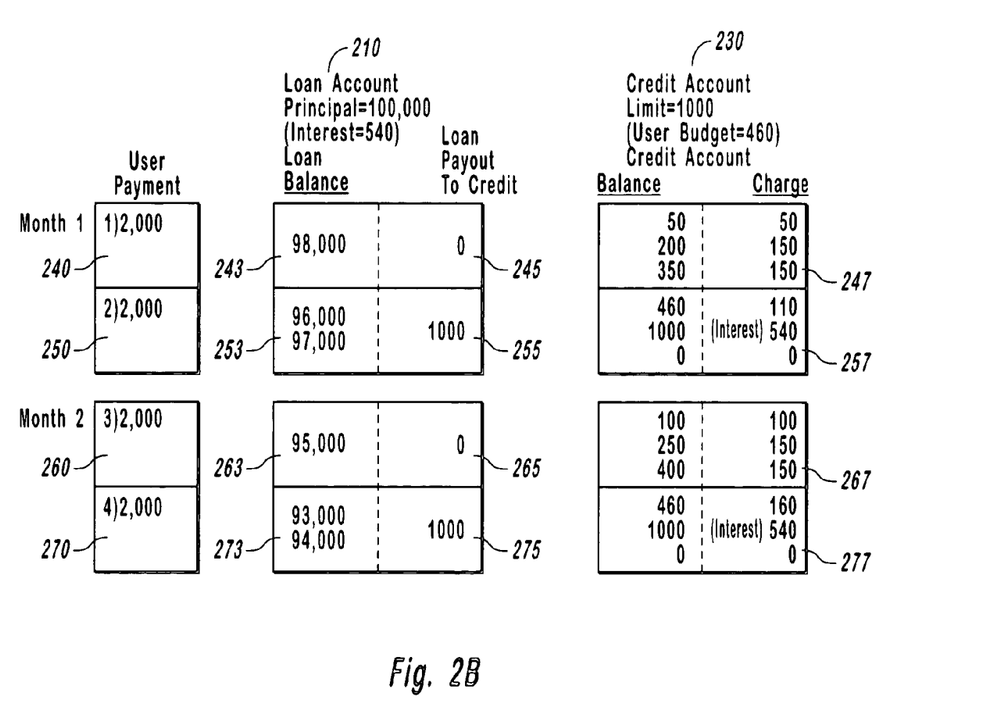
FIG. 2B illustrates a table of example loan principal and interest values when implementing the concepts depicted in FIG. 2A.

FIG. 2B illustrates a sequential over view of blocks or steps in a method for implementing the system depicted in FIG. 2A, wherein the user 200 deposits the same amount of user payments into the loan account 210 on a bi-weekly basis for two months. As shown, the user 200 applies a first user payment 240 to the loan account 210, which causes the loan balance of $100,000 to drop, in step 243, to a balance of $98,000. Since the user applied the entire fund 240 to the loan principal 217, the user 200 incrementally spends the credit account 230 balance (not to exceed a balance of $460). Step 247 illustrates the credit account 230 balance on three selected days, as the user accommodate monthly personal expenses with the credit account 230. As shown in step 245, since the credit account 230 has not yet closed (i.e., not the end of the month), the lender's 220 funds to apply to the credit account 230 are $0.

When the user applies a next user payment 250, step 253 shows that the account balance principal drops $98,000 to $96,000. Furthermore, as the end of the month approaches, the user 200 continues to charge, step 247, expenses to the credit account 230, in accordance with the user's monthly budget 205, such that the balance rises to $460. Either by the lender's 220 or the user's 200 direction, the credit account 230 is then used to pay off the monthly interest on the loan account 210. As shown in step 257, adding a monthly interest payment of $540 to the credit account balance of $460 causes the credit account 230 balance to rise to a total of $1,000. In at least one implementation, this occurs at (or just prior to) the end of the credit account 230 grace period.

Also at the end of, or just prior to, the expiration of the credit account 230 grace period, the lender 220 increases the loan account 210 balance to pay off the credit account 230 in full, as shown in step 255. As shown in step 253, this causes the loan account 210 principal balance to rise from $96,000 to $97,000. Since the loan account 210 increase occurs at the end of the credit account 230 grace period (i.e., end of the month), the rise is only momentary since the user will deposit the next bi-weekly funds soon (i.e., beginning of the next month, step 260). In particular, the proximity of a conventional credit account 230 grace period (end of the present month) to the next bi-weekly user payment (first day or week in the following month) is typically 10 days or less. Since this timing can be important, and to ensure the timing does not stretch too long, the lender 220 may require the user 200 to have funds deposited automatically from the funding or paying party (e.g., employer, trust administrator, etc.)

FIG. 2B further shows how the loan account 210 principal decreases with each continuing payment. For example, as shown in step 260, the user's next fund pays down the principal balance, in step 263, from $97,000 to $95,000. As before, since the user 200 applied the entire fund 260 to the loan principal 217, the user spends the credit account 230 balance, step 267, to accommodate monthly expenses (not to exceed $460). Step 270 shows that the user 200 deposits a next bi-weekly fund into the loan account 210, such that, as shown in step 273, the principal drops from $95,000 to $93,000. Moreover, as shown in step 265, since the credit account 230 has not yet closed (i.e., not the end of the second month), the lender's 220 funds to apply to the credit account 230 are $0.

At the end of the credit account 230 grace period, step 277 shows that the credit account 230 pays the loan account 210 interest of $540, such that the credit account balance rises from $460 (user expenses) to $1,000 (user expenses+ monthly loan interest). At the end of, or just prior to, the credit account grace period, step 275 shows that the lender 220 then pays off the credit account 230 balance of $1,000 in full. As shown in step 273, this causes the principal balance 217 to rise from $93,000 to $94,000, which ultimately decreases again when user 200 deposits the next user payment (not shown) for the next month. As this sequence continues for each month, the daily amortized monthly interest amount decreases as the principal decreases, allowing the user either to apply a greater amount of the user payment to principal, or freeing up some of the user payment as extra cash.

Accordingly, FIG. 2B illustrates one implementation of a payoff sequence in which each user 200 applies continuing funds directly toward the loan account 210 principal 217. There are, however, additional ways in which these concepts can be implemented within the context of the present invention. For example, a lender 220 can configure the revolving loan account 220 with debit, credit, and/or check writing privileges, and can further allow such privileges up to a certain access limit. In some cases, the check writing privileges can exceed the original loan principal, for example, based on the lender's determination of equity in the purchased item. As such, the monthly loan interest 218 would be paid directly with reference to equity in the purchased item, such as up to the amount by which the principal has been paid down from the initial loan amount. Alternatively, the lender 220 can set the debit, credit, and/or check writing privileges for an access limit not to exceed a certain loan to value (LTV) ratio.

In another implementation, the lender 220 can configure an ordinary checking account with an overdraft limit that is sufficient to cover the monthly loan interest. The user 200 may then elect not to deposit all of the user payments into the loan account 210. For example, the user can direct a portion of the funds to be directed to the loan account 210, and another portion of the funds to be directed into the ordinary checking account. As such, the user 200 would be allowed to write checks, or use a debit/credit card attached to the ordinary checking account up to any available access limit, such as for any available balance. At the end of the month, the lender 220 can then pay the monthly loan interest 218 with the overdraft portion of the account, payoff the overdraft portion with the revolving loan account 210, and then fund the checking account by a predetermined amount, such as an access limit previously agreed-to between the lender and the user 200. As such, one will appreciate that there are a wide variety of ways in which the disclosed concepts can be implemented.

Figure 3:
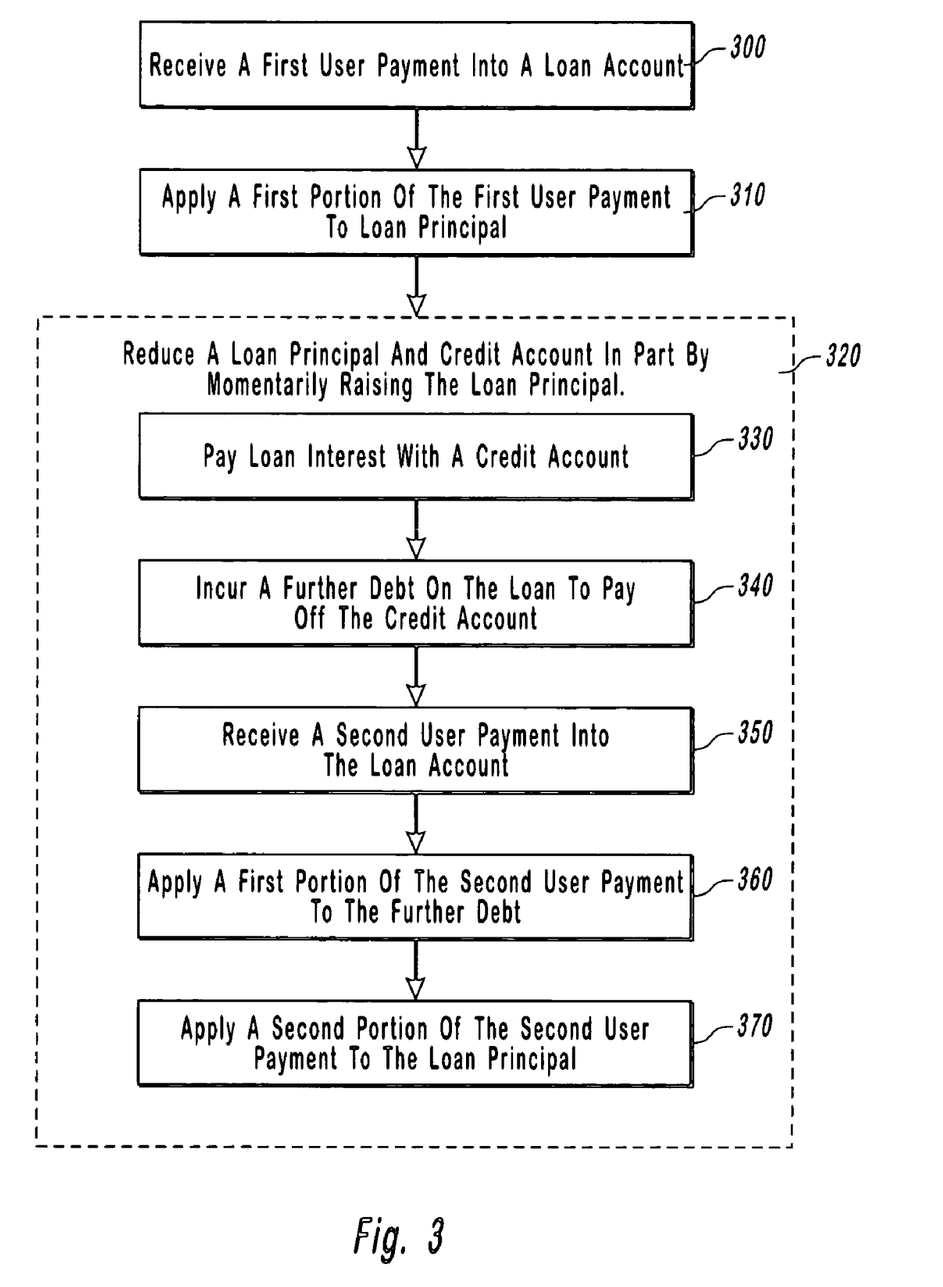
FIG. 3 illustrates a method for paying down a loan principal and loan interest in accordance with an implementation of the present invention.
Figure 4:
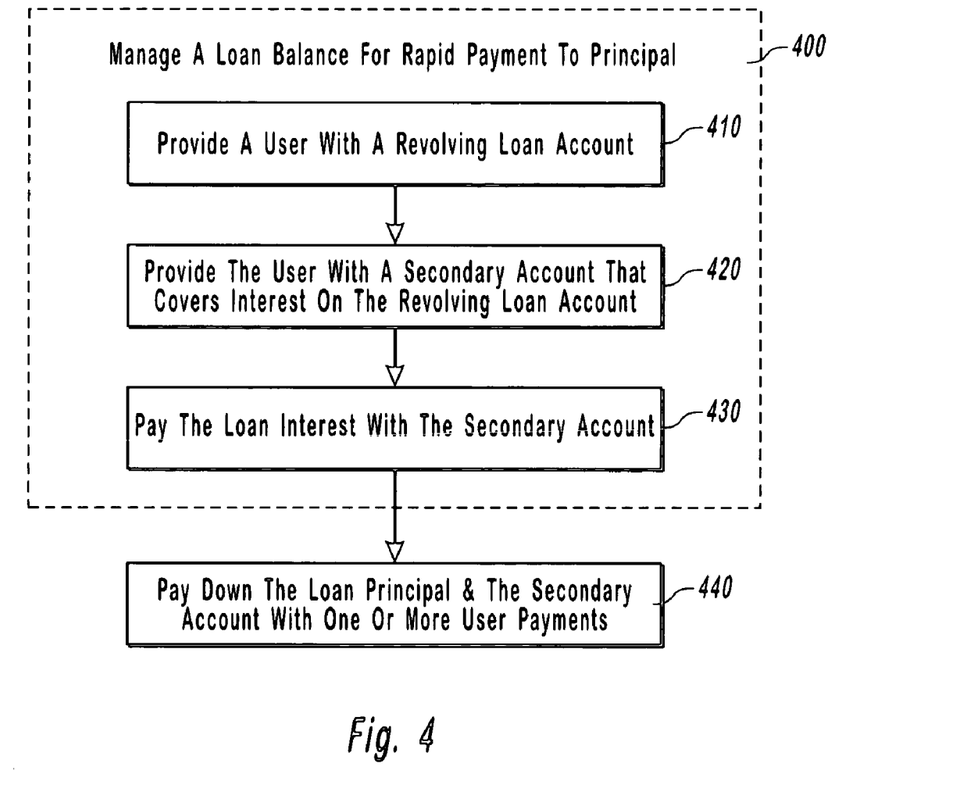
FIG. 4 illustrates a method for providing a user with a loan program that can be used to automatically pay down a loan principal and loan interest in accordance with an implementation of the present invention.

The present invention may also be described in terms of methods comprising functional steps and/or non-functional acts. FIGS. 3 and 4 illustrate exemplary flow charts for paying a loan principal, such that equity in the property is increased more rapidly that otherwise possible without substantially burdening a user's monthly expenses. The methods of FIGS. 3 and 4 will be discussed with respect to schematic diagrams illustrated in FIGS. 2A and 2B.

As shown in FIG. 3, a method for paying a loan principal comprises an act 300 of receiving a first user payment into a loan account. Act 300 includes receiving a first user payment into a loan account, wherein the first user payment pays down a first portion of the loan principal. For example, a lender 200 can receive a user payment 240 in the form of a manual deposit, or an automatic EFT, and apply 243 the user payment directly to the existing loan principal balance. In addition, the method comprises an act 310 of applying a first portion of the first user payment to the loan principal. For example, when the user payment is applied to the loan account 210, all of the user payment can be applied directly to the loan principal 217, or a portion can be applied to the loan principal 217, and another portion can be applied to a cash account.

FIG. 3 also shows that the method further comprises a functional step 320 for reducing a loan principal and credit account in part by momentarily raising the loan principal. Step 320 includes reducing a loan principal and credit account in part by momentarily raising the loan principal, such that the loan account pays off a credit account that was used to help cover loan expenses without incurring a greater interest penalty. Although step 320 can comprise any number or order of corresponding non-functional acts, FIG. 3 shows that step 320 comprises an act 330 of paying the loan interest 218 with a credit account.

Act 330 comprises paying at least monthly interest on the loan account with a credit account, wherein the credit account comprises a credit limit and a grace period. For example, the lender 220, or a third party vendor, can provide a user 200 with a credit, account 230 that has a sufficient credit limit to cover the monthly loan interest 218 and the user's monthly budgetary expenses 205. The lender 220, or third party vendor, can then pay the monthly loan interest 218, step 277, at the end of the credit account grace period. From the perspective of loan account 210, loan account 210 receives a payment for at least monthly interest 218 from credit account 230.

By way of explanation, the lender 220 can provide the credit account 230 itself, or through a company that is owned by the lender 220, through a subsidiary of a company that owns the lender 220, or that is a parent company of the lender 220. Thus, reference to a "third party provider" refers to a provider that is wholly unrelated to—or "different" from—the lender in the ordinary course of business.

Step 320 further comprises an act 340 of incurring a further debt on the loan to pay off the credit account. Act 340 includes incurring a further debt on the loan (thus, causing the amount owed on the loan to increase) to pay off the credit account in full at the end of the credit account grace period. For example, after a credit account 230 has been used (e.g., steps 247, 257) to pay the user's monthly expenses 205, and the monthly loan interest 218, the lender 220 can raise the loan account 210 balance an amount sufficient to pay off the credit account 230, e.g., depicted in steps 253 and 255. Since this occurs before or at the end of the credit account 230 grace period, the lender 220 pays off the credit account 230 balance without incurring additional interest or penalties. In one embodiment, the loan account 210 is a home equity line of credit that raises automatically by a payment made to the credit account balance, such that the lender need not necessarily take extra steps to raise the loan account 210 balance.

In addition, step 320 comprises an act 350 of receiving a second user payment into the loan account. Act 350 includes receiving a second user payment into the loan account. For example, before or after the lender 220 has applied the loan account 210 to pay off the credit account 230 balance (e.g., step 255), the user can deposit a next user payment (e.g., step 250 or step 260) into the loan account 210. Depending on the credit card grace period, this can occur before the end of the month (i.e., step 250), or sometime after the beginning of the next month (i.e., step 260). Step 310 further comprises an act 360 of applying a first portion of the second user payment to the further debt.

Act 360 includes applying at least a first portion of the second user payment to the further debt on the loan. For example, depending on the timing of the second user payment relative to the further debt on the loan account (e.g., before or after the further debt), a portion (all or less) of the second user payment may be applied to the loan principal 217 before the loan account 210 is raised to cover the credit account balance. In such a case, the further debt on the loan account will have been covered in advance by the first portion of the second user payment. If the further debt on the loan occurs before or at substantially at the time of the second user payment, then the first portion of the user payment could be thought of as being applied directly to the further debt on the loan.

Step 310 further comprises an act 370 of applying a second portion of the second user payment to the loan principal. Act 370 includes applying a second different portion of the second user payment to the loan principal. For example, if the first portion of the second user payment is just enough to cover the further debt on the loan, the second portion of the second user payment comprises one or more remainders of the second user payment. Thus, the second different portion of the second user payment can be applied directly to the loan principal 217, while yet another portion (e.g., a third different portion) of the second user payment can be applied to another user account.

FIG. 4 illustrates a method in which a lender provides a user with a loan program that can pay the loan account, such that equity in the property is increased more rapidly that otherwise possible without substantially burdening a user's monthly expenses. In particular, FIG. 4 shows a method comprising a functional step 400 for managing a loan balance with multiple accounts in order to help a user rapidly decrease the loan balance. Step 400 includes automatically managing a loan balance with multiple accounts, such that the lender can help the user make frequent, large payments to the loan principal with relative efficiency. For example, the lender 220 can implement computer-executable instructions, or software, that identify one or more accounts for a user, and that coordinate the transition of payments between two or more accounts. In one implementation, the software is configured such that the user applies maximum payments to principal without incurring additional interest penalties.

Although step 400 can comprise any number or order of corresponding non-functional acts, FIG. 4 shows that step 400 comprises an act 410 of providing a user with a revolving loan account. Act 410 includes providing a user with a revolving loan account, the loan account having a loan principal and a monthly loan interest. For example, in response to a user's request to finance a large purchase item, the lender 220 can offer a user a loan program that includes a revolving loan account 210 secured to the purchase item, wherein the loan comprises a principal portion 217 and a monthly interest portion 218. In at least one implementation, the lender 220 amortizes the monthly interest on a daily basis.

Step 400 further comprises an act 420 of providing the user with a secondary account. Act 420 includes providing the user with a secondary account having a spending limit based at least on a monthly user budget, and the monthly loan interest. For example, the lender 220 can provide the user with a separate credit account 230 having a credit limit that supports a predetermined user budget 205 and a monthly loan account interest 218. Alternatively, the lender 220 can provide the user 200 with a separate checking account that comprises an overdraft privilege sufficient to cover the monthly loan interest 218.

Still further, the lender 220 can provide the user 200 with check writing, debit, or credit privileges in conjunction with the revolving loan account 210 up to a given spending limit. In each case, the lender 220 configures the loan program so that, for example, the user 200 does not spend more in monthly expenses than are available based on any equity in the purchase item. Other limits, however, may be agreed to between the lender and the user. In any event, the lender 220 configures the loan program such that the user progresses toward paying the principal 217, rather than extending the loan account 210 debt after the period of one or more months.

Step 400 further comprises an act 430 of paying the loan interest with the second account. Act 430 includes automatically paying the monthly loan interest with the second account. For example, the lender 220 can ensure set up the secondary account 230 to automatically pay the monthly loan interest 218, as identified in the loan account 210. In at least one implementation, the lender 220 does so by requiring the secondary account 230 to pay interest at a given time, such as at the end of a monthly cycle for the loan account 210. Alternatively, the lender 220 sets up the secondary account 230 to pay the monthly interest 218 at (or just prior to) the end of a grace period for the secondary account 230.

In addition, FIG. 4 shows that the method comprises an act 440 of paying down the loan principal and the secondary account with one or more user payments. Act 440 includes automatically paying down the loan principal and the secondary account at least in part with one or more user payments, such that the principal is paid down each time at least one of the one or more user's payments are received. For example, the lender 220 can implement automatically deposited, bi-weekly employment payments (e.g., 240, 250) directly into the loan account 210. At least one of the user payments, e.g., step 253, has a portion applied to the loan account principle 217, and another portion that is applied to the monthly interest 218. Furthermore, with bi-weekly payments, at least another payment (e.g., step 243, or step 263) can be applied solely to the account principle 217.

Accordingly, implementations of the present invention allow a user to pay down loan principal in a much more rapid fashion than otherwise possible. For example, a home loan of $268,000, and $59,000 in consumer debt can be paid off aggressively in approximately 8.67 years, without greatly burdening the user's monthly budget constraints. In another example, a loan of $100,000 can be paid off in 12 years using a less aggressive approach, while only paying $45,397 in interest using a 7% annual interest rate. Thus, implementations of the present invention provide users with a substantial savings compared with conventional loans.

Furthermore, the lender can provide this loan payment program to the user in a very efficient manner, saving costs and/or creating revenue for lender. In one example, the savings to the user are great enough that the user can charge as much as $50 to $100 per month in service fees to the user. In another example, the savings are great enough to the user that the lender/provider of the secondary account (or credit account) can also charge another $50 to $100 in service fees to the user.

Service fees such as these are, in some cases, greater than the lender or secondary account provider would otherwise see at the end of a loan term, and would only add from a few months to a couple of years to end of a loan. As such, the loan could be paid off in 9–12 years, as opposed to 7–8 years, still using a user budget that would be more appropriate for a 20–30 year pay off. Compared with paying the loan off in 20–30 years, implementations of the present invention represent a substantial savings to the user, and a benefit to the lender or account provider.

Furthermore, since the loan relies primarily on the home or property value as a security interest, the user can treat the home as something of a liquid asset, such that the user can make cash withdrawals that are guaranteed against the home value. Thus, in at least some implementations, the home or property can be thought of a conventional automated teller machine (ATM).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method, implemented on a computerized mortgage system for reducing a remaining balance of a mortgage loan still requiring payment on a loan account for a specified principal amount associated with real property, wherein the loan account is configured to accrue loan interest on the remaining balance at a specified interest rate and at a specified interval, the method comprising the steps of:

the computerized mortgage system maintaining the loan account at a computer system;

the mortgage system automatically and electronically charging a pre-determined amount of living expenses per specified interval, for one or more of the specified intervals, onto a linked credit card account, the linked credit card account linked to the loan account for at least the purpose of automated electronic transfers of the linked credit card account balance to the remaining balance of the specified principal amount, the linked credit card account having a credit card account interest accrual interval, the credit card account interest accrual interval indicative of when credit card account interest is charged to the linked credit card account based on the balance of the linked credit card account, the linked credit card account also having a grace period after the interest accrual interval such that payment of the balance of the credit card account during the grace period removes accrued credit card account interest being charged to the credit card account;

accruing loan interest on the loan account at the specified rate of interest for the one or more specified intervals based on the remaining balance of the loan account;

the computerized mortgage system automatically and electronically charging the accrued loan interest to the linked credit card account to increase credit card account balance;

receiving a payment into the loan account;

applying the payment to the remaining balance of the principal amount to reduce the remaining balance of the principal amount;

the mortgage system automatically and electronically transferring the credit card account balance to the remaining balance of the principal amount before expiration of the grace period, automatically transferring the credit card account balance causing the credit card account balance to be paid off such that accrued interest charges are avoided and causing the remaining balance of the principal amount to increase by the credit card account balance;

receiving a second payment into the loan account; and applying the second payment to the remaining balance of the principal amount that now includes the automatically and electronically transferred credit card account balance to reduce the remaining balance of the principal amount.

2. The method as recited in claim 1, wherein the linked credit card account is an unsecured credit card account.

3. The method as recited in claim 1, wherein payments-are one or more of an employment compensation, a social security payment, a trust fund payment, an individual retirement account payment, and a payment from a user savings account.

4. The method as recited in claim 1, wherein the loan account is a revolving loan account.

5. The method as recited in claim 4, wherein the loan account comprises a fixed year arm, a fixed year balloon payment, a fixed-interest rate loan, or a variable-interest rate loan.

6. The method as recited in claim 1, wherein a lender of the loan account and an issuer of the credit card account are the same financial institution.

7. The method as recited in claim 1, further comprising an act of using the credit card account to pay a credit card account service fee, such that an issuer of the credit card account receives the credit card account service fee as a payment.

8. The method as recited in claim 1, further comprising an act of charging a loan service fee to the loan account, wherein a lender for the loan account receives the loan service fee as a payment.

9. The method as recited in claim 1, wherein the loan interest is not compounded with the remaining principal.

10. The method as recited in claim 9, wherein the loan interest comprises interest that is amortized at a rate selected from among monthly, weekly, and daily.

11. The method as recited in claim 1, wherein the loan account is a home equity loan account.

12. A computer program product for use in a mortgage system, the mortgage system maintaining a loan account for a specified principal amount associated with real property, the principal amount having a remaining balance still requiring payment, the loan account configured to accrue loan interest on the remaining balance at a specified interest rate and at specified interval, the computer program product for implementing a computerized system of reducing the remaining balance such that the remaining balance can be paid off more quickly and the borrower is assisted in managing other living expenses, the computer program product comprising one or more computer-readable media having stored thereon computer-executable instructions that, when executed by a processor, cause the mortgage system to perform the following:
- automatically and electronically charge a pre-determined amount of living expenses per specified interval, for one or more of the specified intervals, onto a linked credit card, the linked credit card linked to the loan account for at least the purpose of automated electronic transfers of the credit card balance to the remaining balance of the principal amount, the linked credit card having a credit card interest accrual interval, the credit card interest accrual interval indicative of when credit card interest is charged to the linked credit card based on the balance of the linked credit card, the linked credit card also having a grace period after the interest accrual interval such that payment of the balance of the credit card during the grace period removes accrued credit card interest being charged to the credit card;
- accrue loan interest on the loan account at the specified rate of interest for the one or more specified intervals based on the remaining balance of the loan account;
- automatically and electronically charge the accrued loan interest to the linked credit card to increase credit card balance;
- receive a payment into the loan account;
- apply the payment to the remaining balance of the principal amount to reduce the remaining balance of the principal amount;
- automatically and electronically transfer the credit card balance to the remaining balance of the principal amount before expiration of the grace period, automatically transferring the credit card balance causing the credit card balance to be paid off such that accrued interest charges are avoided and causing the remaining balance of the principal amount to increase by the credit card balance;
- receive a second payment into the loan account; and
- apply the second payment to the remaining balance of the principal amount that now includes the automatically and electronically transferred credit card balance to reduce the remaining balance of the principal amount.

13. The computer program product as recited in claim 12, wherein the loan account is a revolving loan account.

14. The computer program product as recited in claim 12, wherein the loan account comprises a fixed year arm, a fixed year balloon payment, a fixed-interest rate loan, or a variable-interest rate loan.

15. A mortgage system, the mortgage system executing a computer program for reducing a remaining balance of a mortgage loan still requiring payment on a loan account for a specified principal amount associated with real property, wherein the loan account is configured to accrue loan interest on the remaining balance at a specified interest rate and at a specified interval, the mortgage system comprising:
- a storage device;
- a processor programmed to:
  - receive a request for automatically and electronically charging a pre-determined amount of living expenses per specified interval, for one or more of the specified intervals, onto a linked credit card account, the linked credit card account linked to the loan account for at least the purpose of automated electronic transfers of the linked credit card account balance to the remaining balance of the specified principal amount, the linked credit card account having a credit card account interest accrual interval, the credit card account interest accrual interval indicative of when credit card account interest is charged to the linked credit card account based on the balance of the linked credit card account, the linked credit card account also having a grace period after the interest accrual interval such that payment of the balance of the credit card account during the grace period removes accrued credit card account interest being charged to the credit card account;
  - accrue loan interest on the loan account at the specified rate of interest for the one or more specified intervals based on the remaining balance of the loan account;
  - automatically and electronically charge the accrued loan interest to the linked credit card account to increase credit card account balance;
  - receive data representing a payment into the loan account;
  - apply the data representing the payment to the remaining balance of the principal amount to reduce the remaining balance of the principal amount;
  - automatically and electronically transfer the credit card account balance to the remaining balance of the principal amount before expiration of the grace period, automatically transfer the credit card account balance causing the credit card account balance to be paid off such that accrued interest charges are avoided and cause the remaining balance of the principal amount to increase by the credit card account balance;
  - receive data representing a second payment into the loan account; and
  - applying the data representing the second payment to the remaining balance of the principal amount that now includes the automatically and electronically transferred credit card account balance to reduce the remaining balance of the principal amount.

16. The system as recited in claim 15, wherein the linked credit card account is an unsecured credit card account.

* * * * *